April 16, 1963 W. I. WORKMAN 3,085,515
PRIMING PUMP
Filed Nov. 24, 1961

United States Patent Office 3,085,515
Patented Apr. 16, 1963

3,085,515
PRIMING PUMP
Woodrow I. Workman, Hill, N.H., assignor to International Packings Corporation, Bristol, N.H., a corporation of Massachusetts
Filed Nov. 24, 1961, Ser. No. 154,696
6 Claims. (Cl. 103—178)

This invention relates to pumps and more particularly to an accelerator priming pump which embodies a new and useful piston seal, which seal combines the functions of a seal and a valve. Said seal is the subject matter of a prior application, Ser. No. 30,540, filed May 20, 1960, now Patent No. 3,052,476, and this application is a continuation in part thereof.

In general the pump comprises a hollow cylinder having at one end thereof a fluid inlet, and at the other end a fluid outlet. Disposed between the ends of the cylinder is a piston having a piston rod attached thereto extending through a suitably sealed opening in one end of the cylinder. The piston has an annular groove extending about the mid-portion thereof and in the bottom of said groove is at least one hole leading through the piston and into the chamber defined by the piston and the cylinder end having the fluid outlet means. Located within the annular groove is an arched sealing ring of resilient material which in cross-section is narrower than the groove, and which is in contact with the cylinder walls but not with the bottom of the groove. The arched sealing ring functions both as a seal and as a valve during the operation of said pump as will be shown in the detailed description.

Additional features, objects and advantages of the invention will be more readily apparent from the following detailed description thereof and the accompanying drawings wherein.

Figures 1, 2:
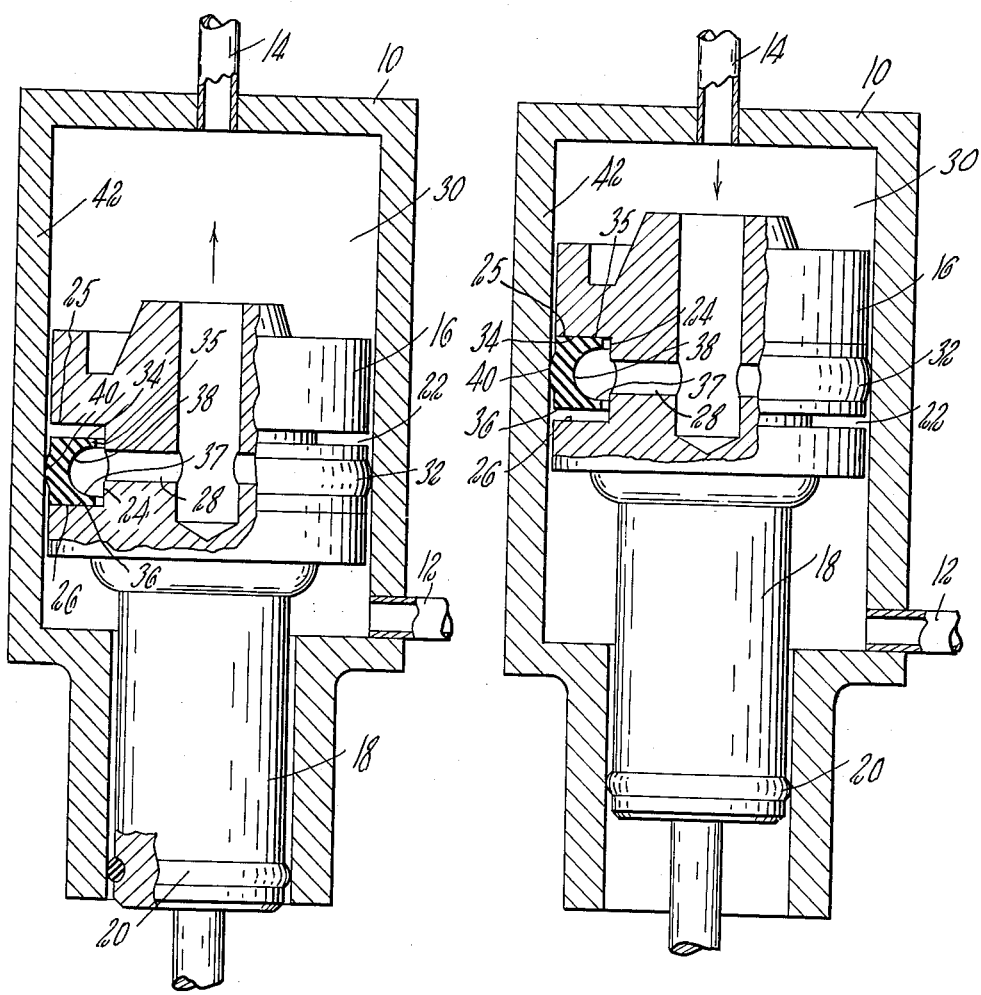
FIG. 1 is a side elevation of the pump in section showing the piston partly in section in its exhaust stroke.
FIG. 2 is a side elevation of the pump showing the piston partly in section in its intake stroke.

Referring to the drawings, FIGS. 1 and 2 clearly show the structure of the invention. It will be noted that the pump comprises a cylinder 10 at one end of which is located a fixture or pipe comprising the fluid inlet 12 leading to a fluid source. Disposed at the opposite end of the cylinder is a similar fixture which comprises the fluid outlet 14. Located between the respective ends of the cylinder 10 is a piston 16 which has attached thereto a piston rod or actuating member 18, said actuating member 18 extending from the piston through an opening in one end of the cylinder 10. The actuating member 18 is provided with a seal 20 such as an O-ring seal to prevent leakage of the fluid from within the pump.

The piston 16 of the pump is spaced a substantial distance from the wall 42 of the cylinder and is provided with an annular groove 22 of rectangular cross-section with a straight cylindrical bottom surface 24 and with straight radial side surfaces 25 and 26. Positioned in the bottom surface 24 of said groove 22 is at least one hole, comprising a fluid transfer chamber 28, which leads either directly or indirectly to the cylinder outlet chamber 30, defined by the piston 16 and the end of the cylinder 10 housing the fluid outlet 14.

Within the groove 22 is positioned a flexible sealing element 32 which is made of a resilient and flexible material such as rubber, plastic or other synthetic material. In cross-section said sealing element is generally square and has radially extending flat side surfaces 34 and 36 with the bottom of said seal having an inwardly arched recessed configuration 38 providing at least one relatively thin flexible sealing lip 35 and 37 of said groove respectively.

The diameter of said sealing element at said lips is slightly greater than the inner diameter of said groove 22 so that in operation the sealing element is spaced above the bottom of the groove. The outer face of said sealing element has a rounded surface 40 which is narrow relative to the base of the sealing element and is in contacting relation with the walls 42 of the cylinder 10. Of particular importance, as will be shown, is the fact that the width of said sealing element 32 is less than the width of the groove 22, thus permitting lateral movement of the sealing element within the groove.

In operation the actuating member 18 is operated to move the piston 16 in the direction of the fluid outlet 14, as shown in FIG. 1. As the piston is thus moved the sealing element 32 remains stationary until the lip 37 contacts the side surface 26 of the groove 22, at which point the sealing element begins to move with the piston. As the piston and sealing element thus begin to move the pressure of the liquid in the outlet chamber increases as does that of the liquid under the arch 38 of the sealing element, thus urging the sealing element outwardly. Thus an effective seal prevents the leakage of liquid from the outlet chamber to the inlet chamber. This results in liquid being efficiently pumped out of the outlet chamber and the resulting vacuum in inlet chamber causes fuel to enter said chamber for use in the next pumping cycle.

As the piston reaches its upper limit, the piston rod 18 operates to reverse the motion of the piston 16. Again the sealing element remains stationary until the side surface 34 contacts the wall surface 25 of the groove, at which point the sealing element also reverses its movement. As FIG. 2 clearly shows, in this filling cycle, the sealing element having shifted relative to the annular groove, the liquid which was drawn into the inlet chamber in the previous cycle is now able to flow between the cylinder walls and the piston, through the liquid transfer chamber, and into the outlet chamber where it remains until the next pumping cycle.

Thus, this pump utilizes a novel sealing element which operates both as a seal and as a valve. Machined valves are thus eliminated and tolerances previously required in machining the groove in the piston and a seal are greatly liberalized. The result is an inexpensive and efficient pump.

Those skilled in the art will readily appreciate the advantages of this invention. The description of this invention is by way of example only, and is in no way intended to limit the scope thereof.

What I claim is:

1. A pump having: an axially movable piston within a cylinder, the diameter of said piston being substantially less than the diameter of said cylinder to permit the flow of liquid between the walls of said piston and said cylinder;

an annular groove of generally rectangular cross-section and of predetermined depth and width around said piston;

a liquid transfer chamber extending from the bottom surface of said groove through said piston into an outlet chamber defined by said piston, the wall surfaces of said cylinder and by the end of said cylinder housing a liquid outlet;

and an annular, resilient sealing element of generally square cross-section positioned in said groove;

said element having inner, outer and side surfaces and said element being narrower than said groove and having a greater inner diameter than the inner diameter of said groove and being in contacting relation with said cylinder wall surfaces and said inner surface of said element being arched away from the inner surface of said groove providing at least one thin relatively flexible sealing lip adjacent the side surface of said groove opposite said outlet chamber.

2. The pump claimed in claim 1, wherein the outer surface of said sealing element has a rounded surface, narrow relative to said inner surface in contacting relation with the wall surfaces of said cylinder.

3. A pump comprising: a piston disposed within the wall surfaces of a cylinder, the diameter of said piston being substantially less than the diameter of said cylinder to permit the flow of liquid between the walls of said cylinder and said piston;

an annular groove of generally rectangular cross-section and of predetermined depth and width extending about said piston;

a liquid transfer chamber extending through said piston from the bottom surface of said groove to a liquid outlet chamber defined by said piston, the wall surfaces of said cylinder and the end of said cylinder having a liquid outlet;

and resilient annular sealing element of generally square cross-section positioned within, and transversely and axially movable within, said groove, said sealing element having inner, outer and side surfaces and said element being in contacting relation with said cylinder wall surfaces and said inner surface of said element being arched away from the inner surface of said groove providing at least one thin relatively flexible sealing lip adjacent the side surface of said groove opposite said outlet chamber.

4. The pump claimed in claim 3 wherein the outer surface of said sealing element has a rounded surface narrow relative to said inner surface in contacting relation with the wall surfaces of said cylinder.

5. A pump comprising: a closed cylindrical chamber having at opposite ends thereof a fluid inlet and a fluid outlet;

a piston, disposed within said chamber, having a substantially smaller diameter than the diameter of the cylinder walls to permit the flow of liquid between the walls of said cylinder and said piston;

an actuating member connected to said piston and extending therefrom, through one end of said cylinder;

sealing means operable to prevent leakage at the point where said actuating means extends through said end of said cylinder;

an annular groove of generally rectangular cross-section and of predetermined depth and width extending about said piston;

a liquid transfer chamber extending through said piston from the bottom surfaces of said groove to the liquid outlet chamber defined by said piston, the walls of said cylindrical chamber and by the end of said chamber containing said liquid outlet;

and an annular sealing element of rubber or other resilient and flexible material of generally rectangular cross-section, said element having inner, outer and side surfaces and said element being narrower than said groove and the inner diameter of said element being greater than the diameter of said groove, said element being thus transversely and axially movable and said element being in contacting relation with said cylinder wall surfaces and said inner surface of said element being arched away from the inner surface of said groove providing at least one thin relatively flexible sealing lip adjacent the side surface of said groove opposite said outlet chamber.

6. The pump claimed in claim 5 wherein the outer surface of said sealing element has a rounded surface, narrow relative to said inner surface in contacting relation with the wall surfaces of said cylinder.

References Cited in the file of this patent

UNITED STATES PATENTS

| 2,420,929 | Buffington et al. | May 20, 1947 |
| 2,841,429 | McCuistion | July 1, 1958 |
| 2,873,132 | Tanner | Feb. 10, 1959 |
| 3,052,476 | Workman | Sept. 4, 1962 |

FOREIGN PATENTS

| 308,083 | Switzerland | Sept. 1, 1955 |
| 561,113 | Great Britain | May 5, 1944 |
| 899,438 | Germany | July 5, 1954 |
| 1,118,313 | France | Mar. 12, 1956 |